US011904619B2

United States Patent

(12) United States Patent
Wachs et al.

(10) Patent No.: US 11,904,619 B2
(45) Date of Patent: Feb. 20, 2024

(54) MECHANICAL HANDWRITING BARCODE APPARATUS AND METHOD OF USE THEREOF

(71) Applicants: David Wachs, Phoenix, AZ (US); Roxanne Abul-Haj, Sedona, AZ (US)

(72) Inventors: David Wachs, Phoenix, AZ (US); Roxanne Abul-Haj, Sedona, AZ (US)

(*) Notice: Subject to any disclaimer, the term of this patent is extended or adjusted under 35 U.S.C. 154(b) by 199 days.

(21) Appl. No.: 17/700,326

(22) Filed: Mar. 21, 2022

(65) Prior Publication Data

US 2022/0297457 A1 Sep. 22, 2022

Related U.S. Application Data

(60) Continuation-in-part of application No. 17/667,716, filed on Feb. 9, 2022, and a continuation-in-part of application No. 17/667,762, filed on Feb. 9, 2022, said application No. 17/667,716 is a continuation-in-part of application No. 17/362,859, filed on Jun. 29, 2021, which is a continuation-in-part of application No. 17/170,844, filed on Feb. 8, 2021, now Pat. No. 11,260,686, which is a division of application No. 16/128,828, filed on Sep. 12, 2018, now Pat. No. 11,052,693.

(51) Int. Cl.

| | |
|---|---|
| ***B41M 5/00*** | (2006.01) |
| ***B43L 13/10*** | (2006.01) |
| ***B41J 11/00*** | (2006.01) |

(52) U.S. Cl.

CPC .............. *B41M 5/00* (2013.01); *B41J 11/007* (2013.01); *B43L 13/10* (2013.01)

(58) Field of Classification Search

CPC ........... B41M 5/00; B41J 11/007; B43L 13/10

See application file for complete search history.

(56) References Cited

U.S. PATENT DOCUMENTS

2009/0213397 A1* 8/2009 Ishikawa ............ H04N 1/00875 358/1.9
2011/0058187 A1* 3/2011 Smith .................... G06Q 10/10 358/1.9

* cited by examiner

*Primary Examiner* — Quang N Vo

(74) *Attorney, Agent, or Firm* — Kevin H. Hazen; Hazen Patent Group, LLC

(57) ABSTRACT

The invention comprises a method and apparatus for producing a handwritten appearance of input text on a marking surface, comprising the steps of: receiving, into a plotter system, a print job related to a first graphic code, the print job comprising a printable media requirement; scanning, with a scanner attached to the plotter system, the first graphic code, the first graphic code previously printed on the marking surface loaded into the plotter system; identifying a particular media type of the marking surface with the first graphic code; confirming the printable media requirement matches the particular media type; and emulating handwriting on the marking surface with the plotter system to yield a marked paper.

20 Claims, 15 Drawing Sheets

600

610

620 630 640 650 660

| ID | Message | From | To | Inserts |
|---|---|---|---|---|
| 1 | Text 1 | Name 1 | Address 1 | None |
| 2 | Text 2 | Name 2 | Address 2 | Gift Card 1 |
| 3 | Text 3 | Name 3 | Address 3 | Gift Card 2 |
| ⋮ | ⋮ | ⋮ | ⋮ | ⋮ |
| n | Text 3 | Name 3 | Address 3 | Gift Card 2 |

FIG. 6

MECHANICAL HANDWRITING BARCODE APPARATUS AND METHOD OF USE THEREOF

CROSS-REFERENCES TO RELATED APPLICATIONS

This application is a continuation-in-part of U.S. patent application Ser. No. 17/667,762, filed Feb. 9, 2022, which is a continuation-in-part of U.S. patent application Ser. No. 17/667,716, filed Feb. 9, 2022, which is a continuation-in-part of U.S. patent application Ser. No. 17/362,859 filed Jun. 29, 2021, which is a continuation-in-part of U.S. patent application Ser. No. 17/170,844 filed Feb. 8, 2021, which is a divisional of U.S. patent application Ser. No. 16/128,828 filed Sep. 12, 2018, all of which is incorporated herein in its entirety by this reference thereto.

BACKGROUND OF THE INVENTION

Field of the Invention

The invention relates generally to a handwritten card method and apparatus.

Discussion of the Prior Art

Patents related to the current invention are summarized here.

Loeb, Michael R., "Realistic Machine-Generated Handwriting with Personalized Fonts", U.S. Pat. No. 7,352,899 (Apr. 1, 2008) describes a system for producing machine generated handwriting having a realistic human appearance using a scanned representation of a person's handwriting.

Problem

There exists in the art a need for a personalized appearance of a machine generated printed and/or plotted document.

SUMMARY OF THE INVENTION

The invention comprises an automated mechanical handwriting system for plotting on documents, such as a markable surface, greeting cards, stickers, notes, and/or stationery, using a real pen or pen-like device.

DESCRIPTION OF THE FIGURES

A more complete understanding of the present invention is derived by referring to the detailed description and claims when considered in connection with the Figures, wherein like reference numbers refer to similar items throughout the Figures.

FIG. 6 illustrates a printing manifest;

Figure 1:
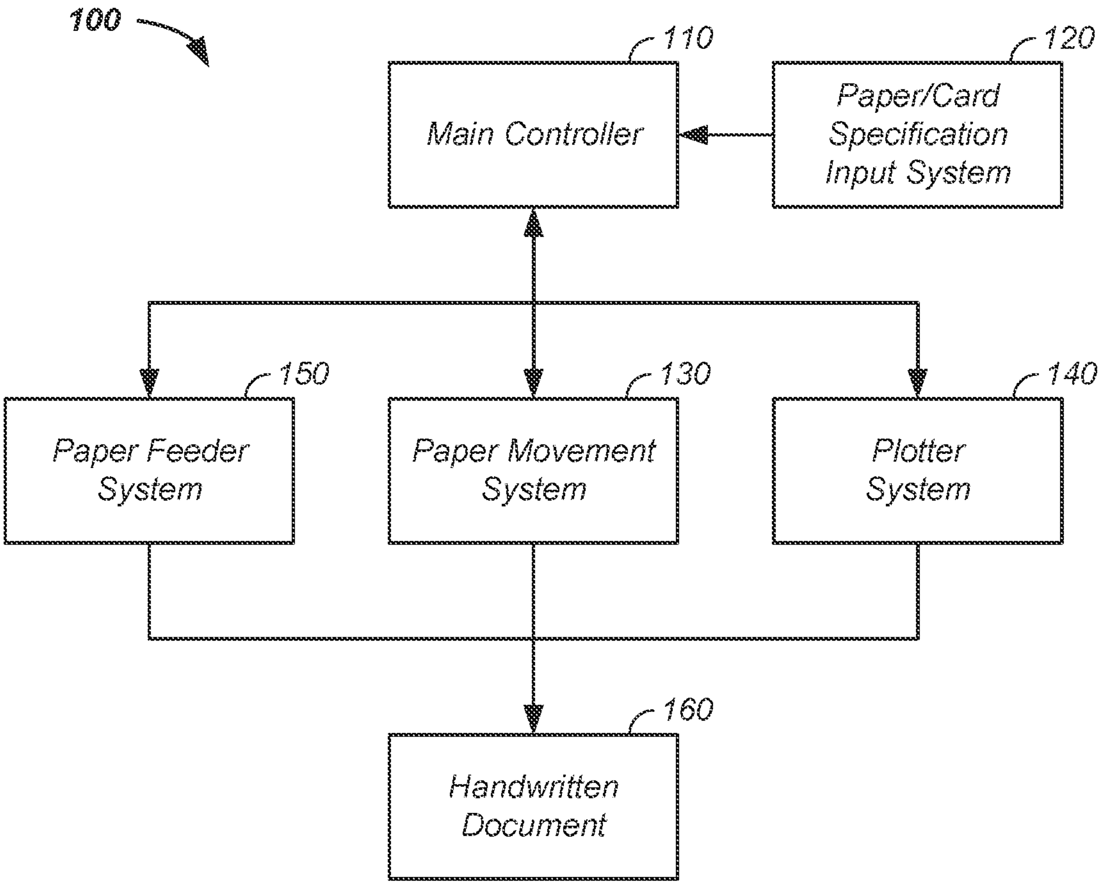
FIG. 1 illustrates a handwriting generation system.

Elements and steps in the figures are illustrated for simplicity and clarity and have not necessarily been rendered according to any particular sequence. For example, steps that are performed concurrently or in different order are illustrated in the figures to help improve understanding of embodiments of the present invention.

DETAILED DESCRIPTION OF THE INVENTION

The invention comprises a method and apparatus for producing a handwritten appearance of input text on a marking surface, comprising the steps of: receiving, into a plotter system, a print job related to a first graphic code, the print job comprising a printable media requirement; scanning, with a scanner attached to the plotter system, the first graphic code, the first graphic code previously printed on the marking surface loaded into the plotter system; identifying a particular media type of the marking surface with the first graphic code; confirming the printable media requirement matches the particular media type; and emulating handwriting on the marking surface with the plotter system to yield a marked paper.

Herein, x- and y-axes define a printable plane of a paper and a z-axis defines a thickness of a paper.

The invention comprises a mechanical handwriting system linked to a user input system to generate a plotted document, such as a greeting card or note, using a conveyor belt unit to support and move the document, a plotter, and a series of rollers to position and constrain movement of the document, which is optionally and preferably linked to a paper feeder system in an assembly line format, where the rollers are optionally and preferably adjustable in position to accommodate varying paper sizes and to allow movement of the document during a plotting period to avoid positional overlap constraints of the rollers and a plotter head of the plotter in a process of plotting the card in sections, where the plotted document optionally and preferably contains an indentation trail emulating a downward force of a human hand writing on a deformable surface, such as a pad of paper.

Herein, a QR code, which is also referred to as a quick response code is a type of matrix barcode and/or a two-dimensional barcode. A QR code uses an array of black and white squares, that appear as squares, rectangles and/or boxes when printed and/or displayed. A QR code is scanned as an two-dimensional image. A barcode is a series of lines having common and/or differing widths with intervening gaps that is read/scanned in a line. Both a barcode and a QR code are examples of machine-readable codes, such as graphical codes, in the form of numbers, lines, squares, and/or patterns. Herein, machine readable codes are also referred to as machine readable graphic codes with or without the use of images and/or numbers. For clarity of presentation and without loss of generality, terminology of QR code and/or barcode is used herein, but the shorthand terminology of QR code and barcode optionally refers to a machine readable code and/or a machine readable graphic code. Herein, a graphical code does not refer to computer language code use by a programmer to write software, such as for sale on a CD-ROM.

Herein, an x-axis and a y-axis define a plane perpendicular to a z-axis, where the z-axis is optionally and preferably aligned with gravity.

Mechanical Handwriting System

Referring now to FIG. 1, a mechanical handwriting system 100 is described. Generally, the mechanical handwriting system 100 is used to generate a printed and/or preferably plotted document, such as a note card and/or a greeting card. For example, the mechanical handwriting system 100 comprises a system using mechanical means to emulate a handwritten card. The mechanical handwriting system 100 comprises a main controller 110 that:

- receives and/or controls a paper specification input system 120, such as input specifying a desired appearance of a handwritten card;
- controls a paper movement system 130;
- controls a plotter system 140; and/or
- controls a paper feeder system 150, where an output of the mechanical handwriting system 100 comprises a printed and preferably plotted output document, such as a note, handwritten card, and/or a handwritten document 160. For clarity of presentation and without loss of generality a handwritten card as the plotted output/document is used as an example of the handwritten document 160. However, it is recognized that the plotted output optionally comprises: (1) any graphic, symbol, and/or text and/or (2) output plotted on any substrate, paper, and/or high quality paper, such as in the form of a decorated card, a greeting card, a sympathy card, a card expressing a sentiment, and/or a foldable card plotted on a front side, a back side, and/or a front and back side.

Still referring to FIG. 1, the mechanical handwriting system 100 is optionally referred to as a robot, such as when under operator control, and/or is referred to as a semi-autonomous robot, such as when operating semi-autonomously. For instance, the semi-autonomous robot optionally and preferably reads a graphical code, such as a bar code on loaded paper in the plotter system 140, retrieves a print job linked to the bar code, and prints the associated job on the bar code marked paper without human input, such as in the actual printing step.

For clarity of presentation and without loss of generality, examples of the paper/card specification input system 120, the paper movement system 130, the plotter system 140, the paper feeder system 150, and the plotted output, such as the handwritten document 160, are provided, infra, to further describe the mechanical handwriting system 100.

Main Controller

Referring still to FIG. 1, the main controller 110 is further described. The main controller 110, a localized communication apparatus, and/or a system for communication of information optionally comprises one or more subsystems stored on a client. The client is a computing platform configured to act as a client device or other computing device, such as a computer, personal computer, a digital media device, and/or a personal digital assistant. The client comprises a processor that is optionally coupled to one or more internal or external input devices, such as a mouse, a keyboard, a display device, network input, a voice recognition system, a motion recognition system, or the like. Optionally and preferably, the processor of the main controller 110 is directly linked, wirelessly linked, and/or linked via the internet to a database or data entry system, such as the paper/card specification input system 120, further described infra. The processor is also communicatively coupled to an output device, such as a display screen or data link to display or send data and/or processed information, respectively. Optionally and preferably, the output device is a plotter system or a handwritten card system 200, further described infra. In one embodiment, the communication apparatus is the processor. In another embodiment, the communication apparatus is a set of instructions stored in memory that is carried out by the processor.

Referring still to FIG. 1, in one example the main controller 110 receives/transforms data from the paper/card specification input system 120 and controls: the paper movement system 130; the plotter system 140; the paper feeder system 150 and sub-components of each of the three systems in generation of the handwritten document 160.

Paper/Card Specification Input System

Referring still to FIG. 1, the paper/card specification input system 120 is further described. Generally, the paper/card specification input system 120 comprises any means to transfer input, such as from a client or user, into a digital format.

For example, the paper/card specification input system 120 comprises a web page, where a user selects and/or inputs a desired input of a plotted document, such as a graphic, a symbol, font, and/or text. Optionally and preferably, the paper/card specification input system 120, such as the web page, allows the user to additionally select/define the format and/or relative positions of the graphic, symbol, font, or text.

Handwriting Generation System

Figure 2:
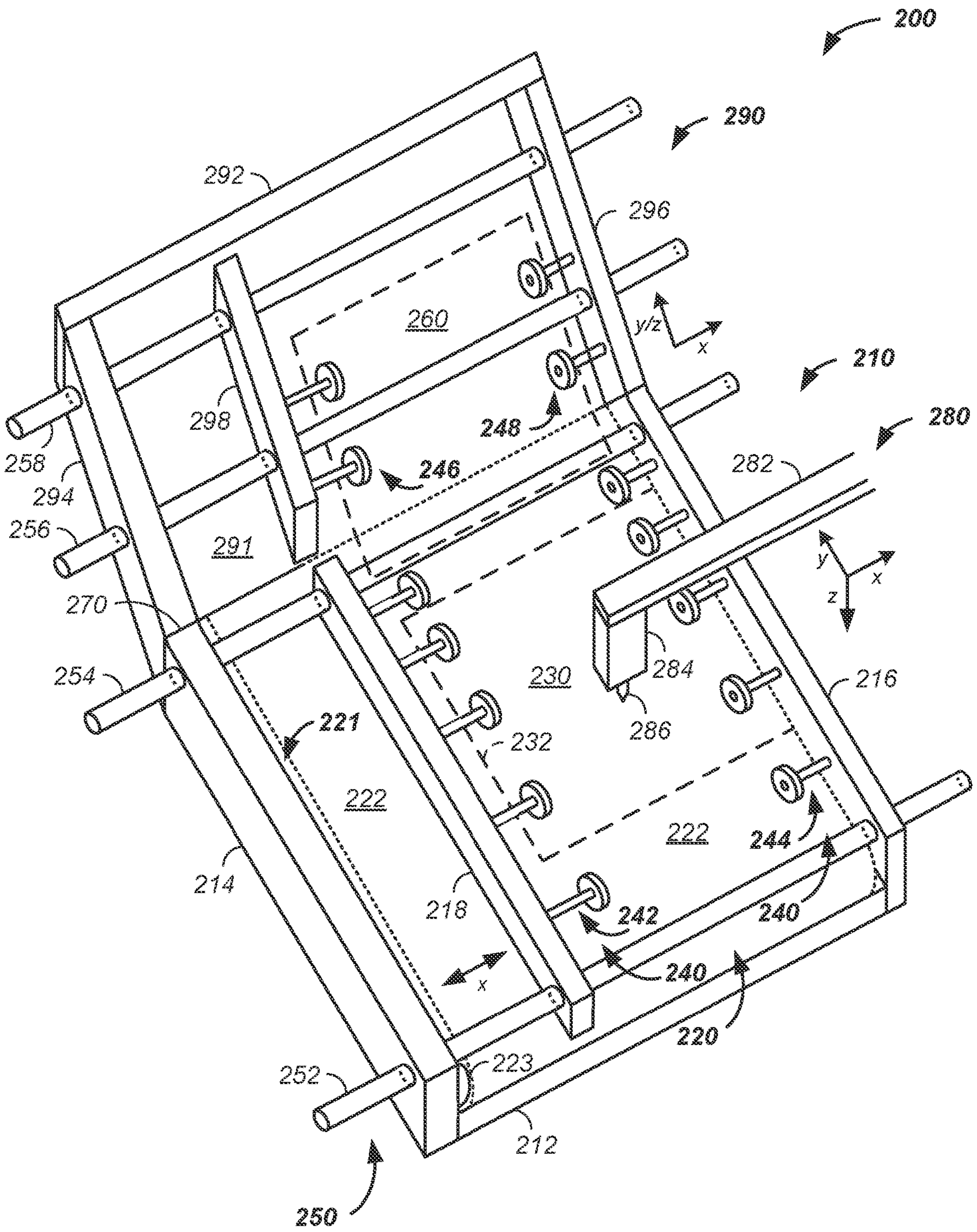
FIG. 2 illustrates a plotter system and a paper feeder system.
Figure 3:
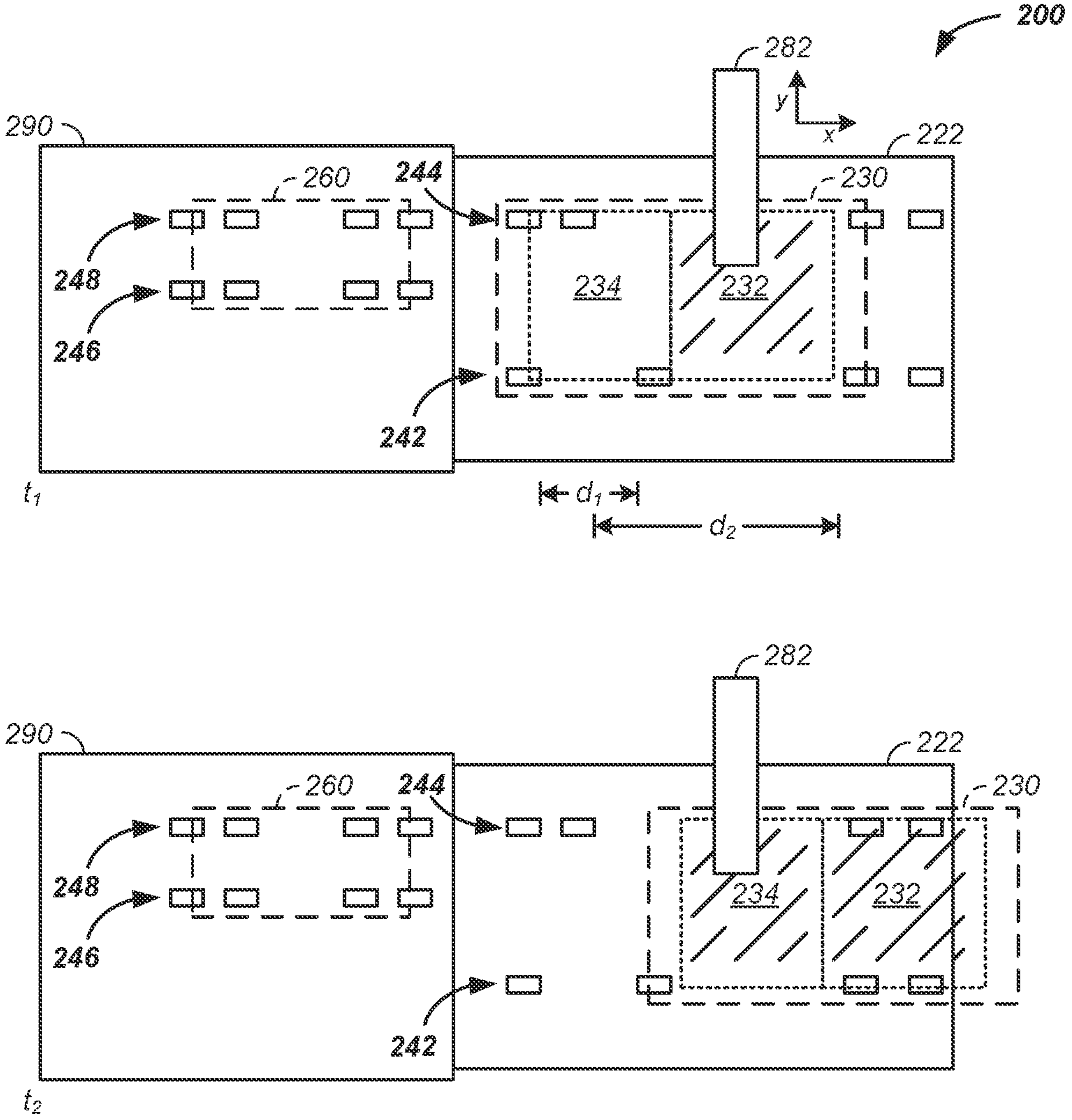
FIG. 3 illustrates a multi-section plotting system.
Figure 4:
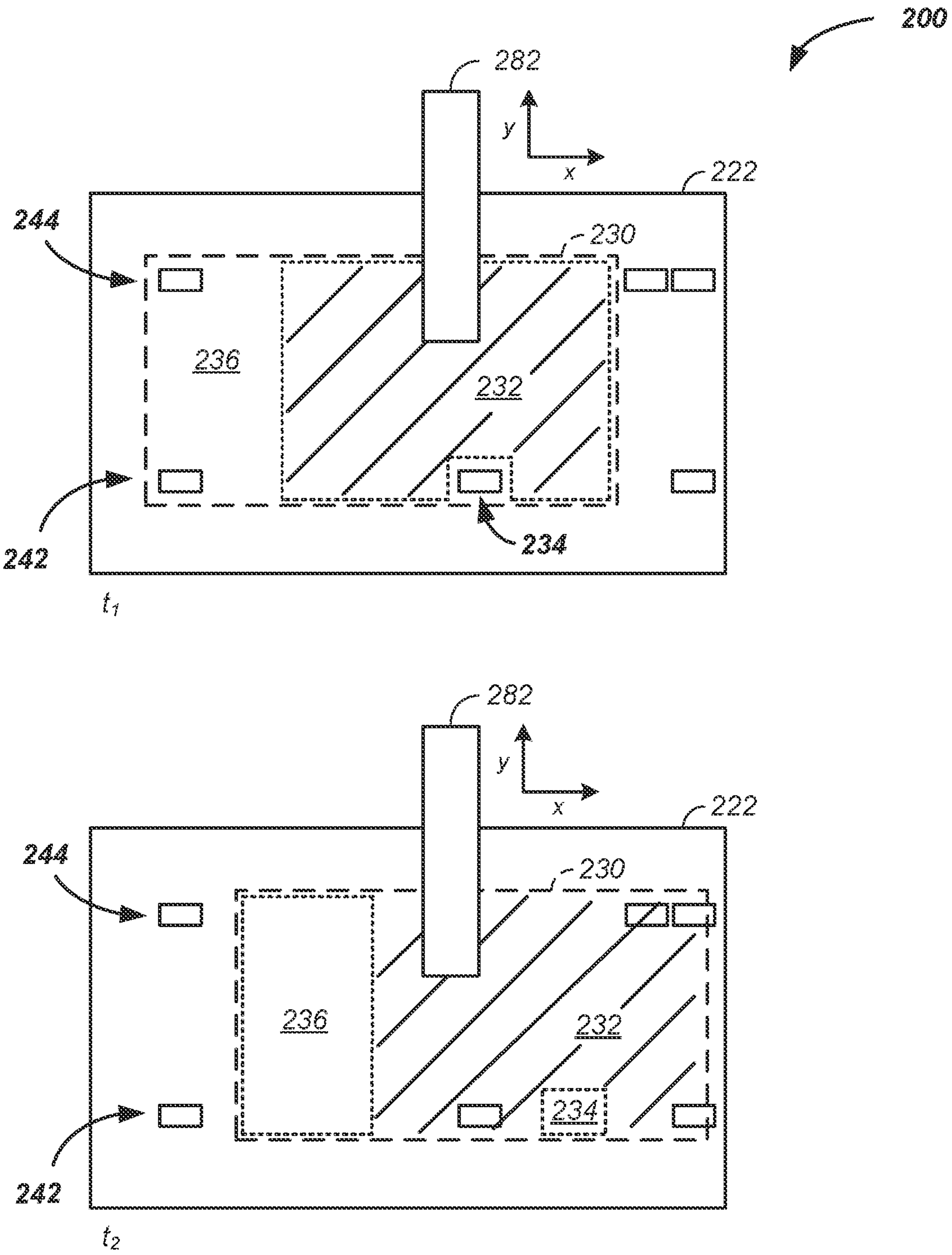
FIG. 4 illustrates a pressure applicator/feeder avoidance system.

For clarity of presentation and without loss of generating, referring now to FIGS. 2-4, a handwritten card system 200 is described, which is an example of the mechanical handwriting system 100. The handwritten card system 200 is linked to the main controller 110.

Paper Movement System

Referring still to FIG. 1 and referring now to FIG. 2, a paper positioning system 210 is described, which is an example of the paper movement system 130. The paper positioning system 210 comprises: a paper positioning base unit 212, such as a unit placed onto a table; a first side rail 214 and a second side rail 216 on opposite sides of the paper positioning base unit 212; and a conveyor belt system 220 positioned between the first side rail 214 and the second side rail 216, where the first and second side rails 214, 216 optionally and preferably support the conveyor belt system 220. The conveyor belt system 220 is functionally used to support and move a marking surface, a markable surface, and/or a piece of paper 230, such as the greeting card or note, along a y-axis. A conveyor belt 222 of the conveyor belt system 220 rolls around conveyor belt wheels 223 driven by a motor or equivalent. Optionally, the conveyor belt 222 has a gap 221 between the conveyor belt 222 and the first and second side rails 214, 216. A plotter 280, further described infra, plots the graphic, symbol, and/or text with an associated font on the paper 230 supported underneath by the conveyor belt system 220. The conveyor belt 222 is optionally a continuously flexible surface and/or is a set of rigid elements linked together, such as in a chain of rigid surfaces.

Still referring to FIG. 2, the paper positioning system 210 optionally and preferably comprises a set of rollers 240, such as a first set of rollers 242 and a second set of rollers 244. As illustrated, each member of the first set of rollers are connected to a first intermediate rail 218, where the first intermediate rail 218 moves along the x-axis relative to the first side rail 214 and the second side rail 216 using one or more roller positioning guides 250, such as a first positioning rail 252 and a second positioning rail 254, where the positioning guides are optionally and preferably: (1) attached to the first intermediate rail 218 and (2) slide through the first and second side rails 214, 216. Mechanical means, not illustrated for clarity of presentation, connected to the main controller 110 and used to slide the first intermediate rail 218 along the x-axis, which allows the first set of rollers to be positioned over the paper 230, such as an outer edge of the paper 230, for a variety of paper sizes. Members of a second set of rollers 244 are optionally attached to the second side wall 216 and/or to a second intermediate rail, not illustrated for clarity of presentation, where each intermediate rail is positioned between the first and second side rails 214, 216 using one or more of the roller positioning guides. The first and second set of rollers 242, 244 are used to provide a downward force on the paper 230, which aids in restricting movement of the paper 230 when using the plotter 280 to mark on the paper 230 using the tip of a marking pen or a plotter pen 286. The downward force applied by the first and second set of rollers 242, 244 on the paper 230 also aids in positioning the paper 230 along the y-axis using movement of a conveyor belt of the conveyor belt system 220.

Still referring to FIG. 2, as a unit the paper positioning system 210 and the plotter 280, under control of the main controller 110 plot on the paper 230 the design/text/font provided by the paper/card specification input system 120.

Plotter System

Still referring to FIG. 2, a plotter 280, which comprises a component of the plotter system 140, prints and/or plots the graphic, symbol, and/or text and associated font on the paper 230 supported underneath by the conveyor belt system 220. The plotter 280 comprises a plotter arm 282, which is movable under control of the main controller 110 along the z-axis into or out of a plotting position and along the x/y-plane in plotting mode or to a plotting position. The plotter uses a connector 284 to position a marking pen, a traditional pen, plotting pen, and/or a plotter pen 286 comprising a pen tip into contact with the paper 230. The plotter system 140 is optionally and preferably configured with multiple marking elements, which comprise selectable tip sizes, selectable tip shapes, and/or selectable ink color. Optionally and preferably, the downforce on the pen is one to twelve ounces and more preferably greater than three and less than nine ounces. The downforce includes the weight of the pen, weight of a weighted pen, and/or an applied force, such as a spring force acting on the marking pen and/or plotter arm 282. A weight of a standard pen is 10 grams or 0.35 ounces. Herein, the plotter pen 286 optionally weighs more than 0.1, 0.3, 0.5, 1, 2, 3, 4, 5, 10, 15, or 25 ounces so that the pen itself provides an indentation trail, where the indentation trail is significant at higher weights.

Handwritten Marking Indentation

A handwritten note by a person typically leaves an indentation trail under the handwritten text, due to the applied pressure of the user writing with a pen on a surface that yields, such as a pad of paper, blotter, backboard, or wood desk. Still referring to FIG. 2, the handwritten card system 200 optionally and preferably mimics the indentation of a person handwriting and leaving marking indentations on paper using a combination of properties of the conveyor belt 222 and the plotter 280. More particularly, the conveyor belt 222 comprises a material designed to yield under pressure of the plotter pen 286 of the plotter system 280 to a degree that yields a handwritten pressure trail under the handwritten elements made by the marking pen or plotter pen 286. For example, the conveyor belt 222 comprises a thin belt of polyurethane, which is a soft material that, in combination with the above described downward force of the pen of about six ounces leaves marking indentations and/or a marking trail that mimics the indentation trail of a personally written note on a pad of paper that yields under the applied force of a pen. The polyurethane belt additionally has friction properties that aids, such as in combination with the set of rollers 240 and/or the downward force of the marking pen, in holding the paper or greeting card in place while the conveyor belt 222 moves and/or the plotter 280 operates. The indentation trail, on the marking document, backed by said deformable surface using said downward force of said plotting pen is optionally and preferably greater than 0.01, 0.1, 1, 2, 3, 5, or 7 micrometers deep and/or less than 1, 2, 5, 10, 25, 50, or 100 micrometers deep, relative to an upper plane of a marking side of the marking document or paper. The indentation trail, trough, or channel, is optionally and preferably continuous through a plotting stroke, such as the downstroke of the letter "S", described infra, while within a plotting stroke, the depth is optionally non-uniform, such as deeper at an initial contact point of the marking pen and a surface of the marking document.

Maintenance

Still referring to FIG. 2, a standard ink refill cartridge is optionally and preferably used as the pigment source inside a housing of the marking pen or plotter pen 286. Optionally, the main controller 110 maintains a total distance that the pen has marked and directs a replacement cartridge installation after a set distance, such as 1000, 2000, 4000, 6000, or more feet based on the ink cartridge capacity.

Paper Feeder System

Referring again to FIG. 1 and still referring to FIG. 2, the paper feed system 150 is further described. For clarity of presentation and without loss of generality, a paper feed assembly 290 is provided as an example of the paper feed system 150, which is connected to the paper positioning system 210 during use to automatically feed a next substrate unit, such as a piece of paper to the conveyor belt 222. The paper feed assembly 290 optionally and preferably comprises a paper feed assembly base unit 291 and/or an end unit 292, which separates a first edge rail 294 and a second edge rail 296. Similar to the first intermediate rail 218, first set of rollers 242, and second set of rollers 244 of the paper positioning system 210, the paper feed assembly 290 uses a second intermediate rail 298, third set of rollers 246, and fourth set of rollers 248 to move, under control of the main controller 110, a new feed sheet 260 onto the conveyor belt 222 to become a new paper 230, such as for production of a new handwritten document 160. Similar to the movement of the first intermediate rail 218 with movement of the first and second positioning rails 252, 254, the second intermediate rail 298 moves with a third positioning rail 256 and a fourth positioning rail 258 relative to the first edge rail 294 and the second edge rail 296. Movement of the second intermediate rail 298, optionally under control of the main controller 110, moves the third set of rollers 246 relative to the fourth set of rollers 248, which allows each new feed sheet 260 to be of any dimension fitting between the first edge rail 294 and the second edge rail 296. Optionally and preferably, the paper feed assembly 290 is parallel to the paper positioning system 210 in terms of the x-axis and the paper feed assembly base unit 291 is set at a downward angle along a y/z-plane to facilitate movement of the new feed sheet 260 to the conveyor belt 222 of the paper positioning system 210.

Plotting

Referring now to FIG. 3, for clarity of presentation and without loss of generality an example of printing or preferably plotting the handwritten document 160 is described. At a first time, $t_1$, a first plot section 232 of a greeting card, an example of the paper 230, is plotted. As illustrated, the plotter arm 282 can freely move over the first plot section 232. However, with the paper 230 in a first illustrated position at the first time, $t_1$, the plotter arm 282 is impeded by members of the first set of rollers 242 when trying to plot a second plot section 234. At a second time, $t_2$, the main controller 110, through control of the conveyor belt 222, has moved the paper 230 to a second position where the plotter arm 282 can freely move over the entire second plot section 234. Generally, any number of plot sections are used, such as n plot sections, where n is a positive integer, such as greater than 1, 2, 3, 4, 5, 6, 8, or 10.

Referring again to FIG. 2 and referring still to FIG. 3, the set of rollers 240 are further described. Any of the members of the first set of rollers 242 are repositionable in grooves in the first intermediate rail 218, which allows a variable first distance, $d_1$, between a first and second member of the first set of rollers 242. Similarly, any of the members of the second set of rollers 244 are repositionable into slots in the second side rail 216 allowing a second variable distance, $d_2$, between any two members of the second set of rollers 244. Notably, the first distance between rollers, $d_1$, is optionally less than, the same as, or greater than the second distance between rollers, $d_2$. Generally, the variable position between rollers and the ability to plot the document, such as a greeting card, using 1, 2, 3, 4, or more plot sections, described supra, allows the plotter arm 282 to access any portion of the paper 230.

Referring now to FIG. 4, another example of use of the mechanical handwriting system 100 is provided, which demonstrates plotting in multiple plot sections at multiple plot times where the number of plot sections differs from the number of plot times. As illustrated, at a first time, $t_1$, the plotter arm 282 is used to plot a first plot section 232 and at a second time, $t_2$, the plotter arm 282 is used to plot both a second plot section 234 and a third plot section 236. Generally, each plot section is of any geometry; two plot sections are optionally non-intersecting or intersecting; and multiple plot sections are optionally and preferably used to avoid an interfering object, such as one or more rollers of the set of rollers 240.

Referring again to FIG. 3 and still referring to FIG. 4, as illustrated the paper 230 is held in a given position on the conveyor belt 222 using any combination of: friction of the polyurethane conveyor belt; downward force of the marking pen 286; any 1, 2, 3, or more rolling elements of the first set of rollers 242; and any 1, 2, 3, or more rolling elements of the second set of rollers 244.

The inventor notes that modern fonts, such as TrueType® (Apple Inc., Cupertino, CA); OpenType® (Microsoft Corporation, Redmond, WA); and PostScript® (Adobe Systems, Inc., San Jose, CA), which are used in word processing programs, use an outline for each character/symbol to represent each character/symbol, which starkly contrasts with an output of the handwriting system 100, which uses single line representation of character strokes in each character, where the character strokes are within the modern font representation, such as down a centerline, along a left edge, a right edge, or a modern font perimeter boundary for each character symbol. The inventor notes that by definition a font is an outline and that the mechanical handwriting system 100 optionally and preferably plots a representation of the font. For example, a font of the letter "S" is a downward curve from top to bottom and a separate upward curve from bottom to top of the "S". However, the main controller direct the plotter 210 to only draw one of the two curves forming the letter "S", a midline between the downward curve and the upper curve, or any non-outline representation of the "S".

Print Processing

Figure 5:
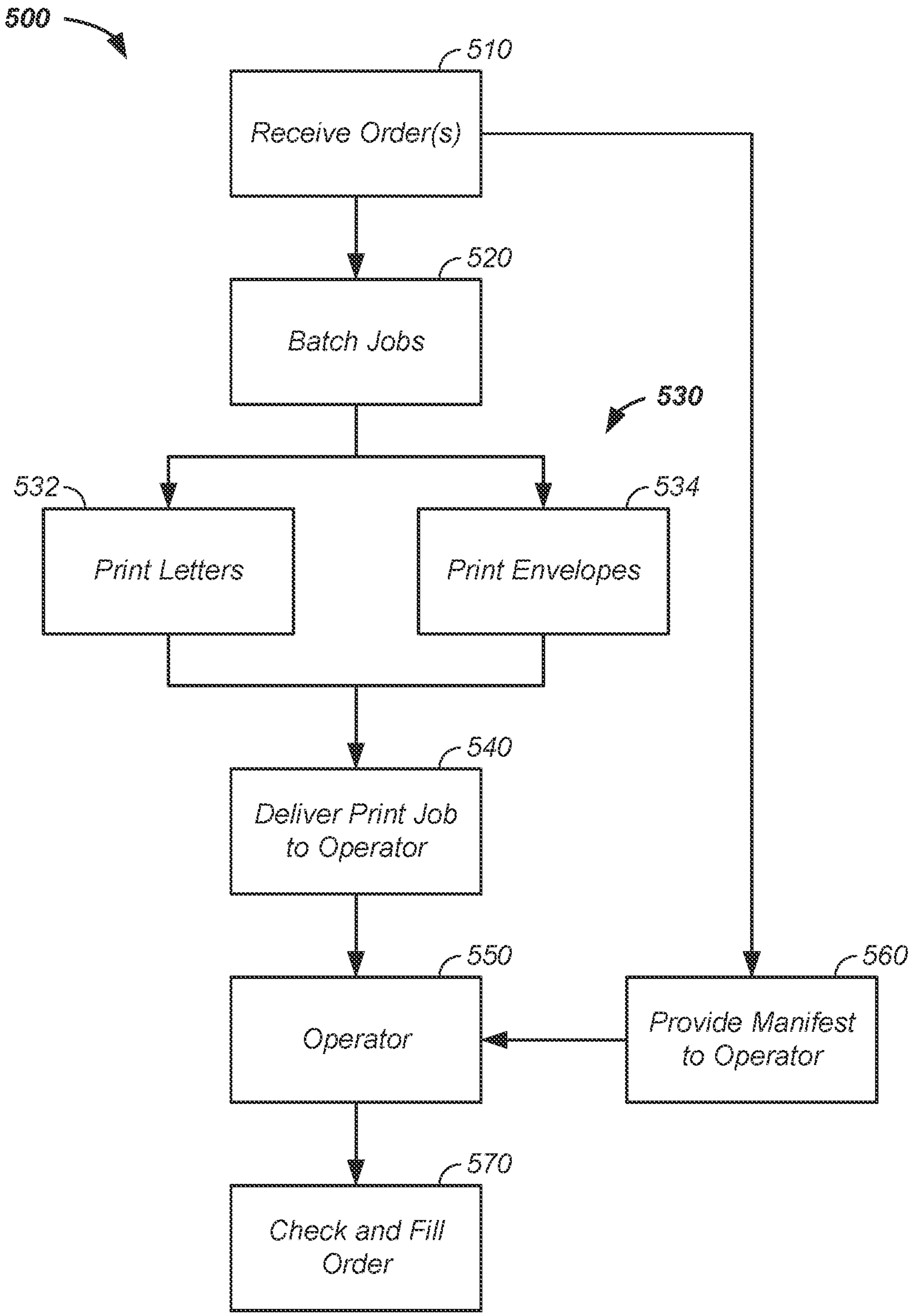
FIG. 5 illustrates a print process.

Referring now to FIGS. 5 and 6, processing print jobs is described, such as in terms of a quality control process.

Referring now to FIG. 5, a print process 500 is illustrated. Generally, an order is received 510 from a customer, such as via an internet portal. Typically, many orders are received, where each job requires certain parameters to implement, such as a paper type, a paper size, and/or an envelope size. Optionally and preferably, the received orders 510 are batched 520, such as in terms of a printing requirement. For instance, jobs are sorted in terms of a printer paper requirement, which aids efficiency. Subsequently, the job(s) are printed 530, such as with the mechanical handwriting system 100. For instance, letters are printed 532 and/or envelopes are printed 534. The printed jobs 530 are subsequently delivered 540 to an operator 550, such as a person assigned a task of checking and sending out orders. The operator 550 is also optionally and preferably provided a manifest 560, which describes print orders for delivery. An example of a manifest 600 is further described, infra. The operator 550 then checks and fills the order 570 in a quality control process, as further described infra.

Referring now to FIG. 6, an example of the manifest 600 is provided. Optionally and preferably, the manifest includes a batch identification code 610, which is also referred to as a manifest code, which optionally and preferably contains many print orders, such as for a single client. As described, supra, the batch identification code is optionally and preferably a bar code and/or a quick response (QR) code. The provided manifest 600 also contain an operator readable identification code 620. As further described infra, when the operator scans the batch identification code 610, a computer prompts the operator for an identification code 620 on the manifest 600 and then proceeds to assure that the correct print jobs are sent to the correct recipients. As to the manifest 600, optionally and preferably, each identification code 620 is associated with a message 630, such as the printed letter 532; a 'from' identifier 640 (from identifier), such as the sender; a 'to' identifier 650 (to identifier), such as a recipient address; an envelope type 534; and an insert 660, such as a business card and/or a gift card; and/or a requirement, such as use of an international stamp.

Quality Control

Figure 7:
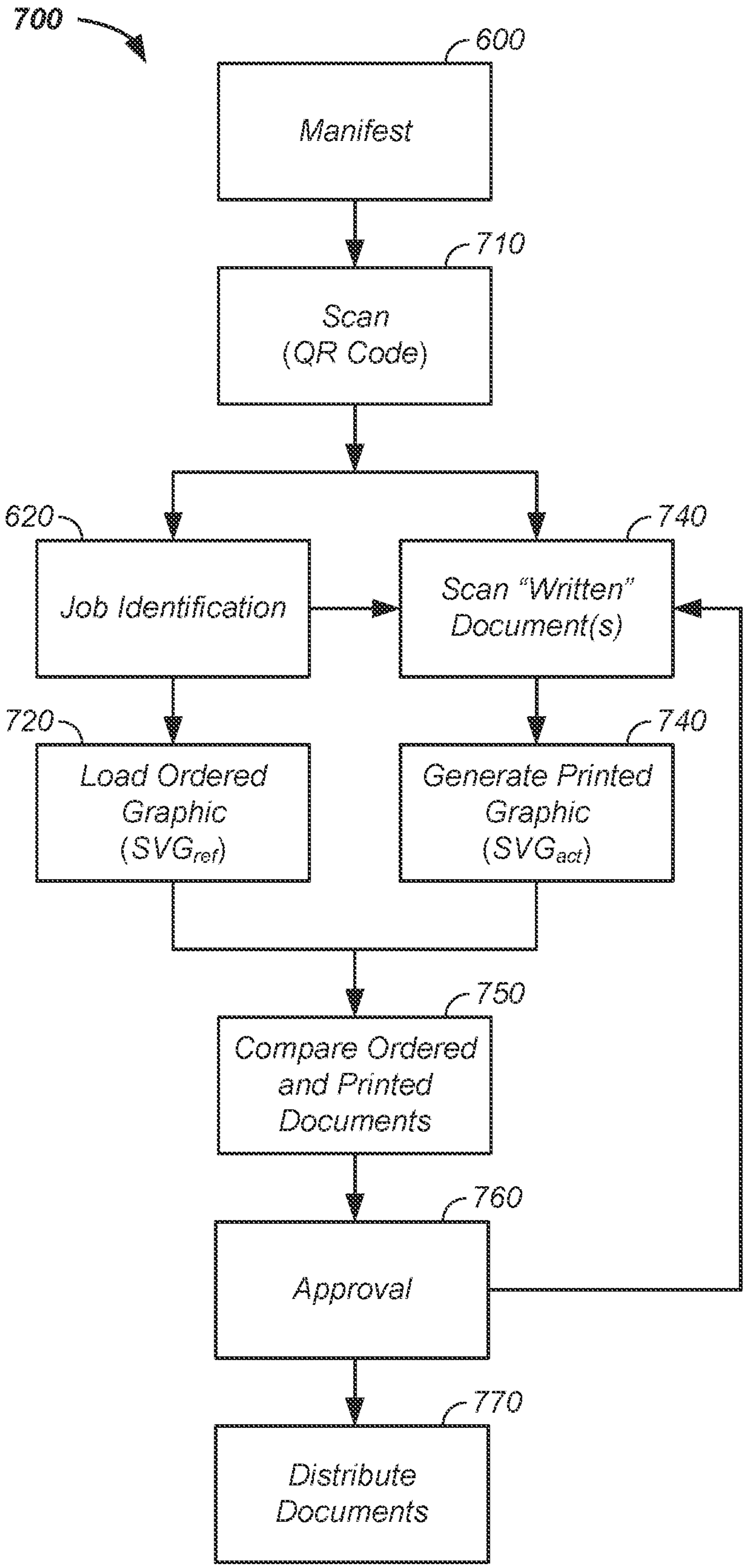
FIG. 7 illustrates a quality control procedure.

Referring now to FIGS. 7, 8(A-D), and 9, generally, a quality control process is implemented to ensure that the correct print job is sent to the correct recipient. The quality control process could simply be matching an address on the printed letter to an address on the envelope and/or manually checking the original received order 510 with the printed result 530 before mailing the order. For clarity of presentation and without loss of generality, examples are used to further describe the quality control process.

Example I

Figure 8A:
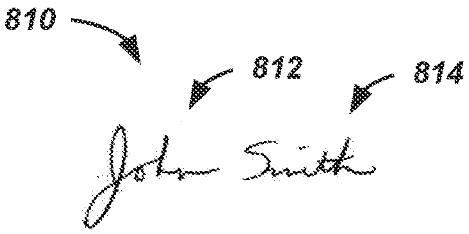
FIG. 8A illustrates a signature.
Figure 8C:
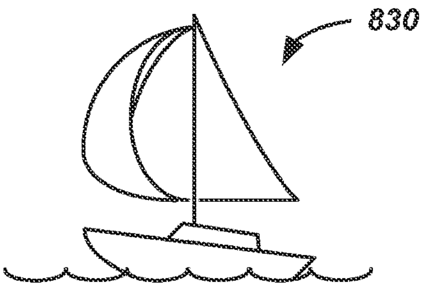
FIG. 8C illustrates a doodle.
Figure 8B:
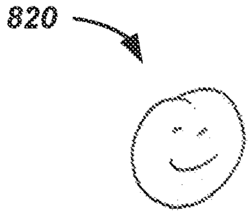
FIG. 8B illustrates a graphic symbol.
Figure 9:
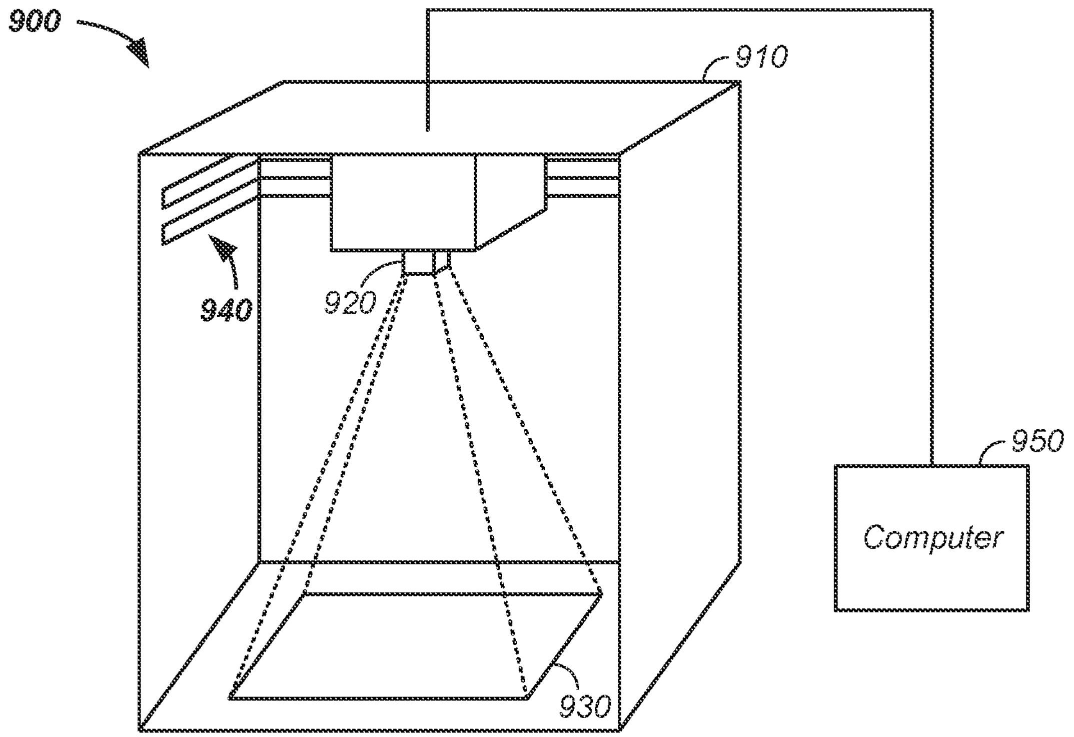
FIG. 9 illustrates a light box.

Referring now to FIG. 7 and FIG. 9, an example of a quality control process 700 is illustrated, which is an optional process associated with the check and fill order step 570. In this example, the operator 550 uses the manifest 600 to validate the filled order 570 matches the received order 510. Particularly, the operator 550 scans 710 the batch identification code 610, such as a QR code, such as with an imaging system 900, such as a light box 910, described infra. Based on the scanned QR code, a computer 950 associated with the light box 910 prompts the operator 550 for a job identification 620 on the manifest 600, such as job #1, job #2, job #3, . . . , job #n, where n is an alphanumeric character. The computer 950 then loads an ordered graphic 720, such as a reference scalable vector graphic, where the ordered graphic 720 represents a particular mailing of the received order 510, such as job #n. Referring now to FIG. 8A and FIG. 8B, the ordered graphic optionally includes a specialized graphic, such as a signature 810, a symbol 820, and/or a doodle 830. Optionally, the signature 810, the symbol 820, and/or the doodle 830 is programmed to change on subsequent mailings to the same address and/or on multiple mailings to the same or similar address. Notably, the signature 810, the symbol 820, and/or the doodle 830 are optionally graphics that are not recognizable to standard optical character recognition software. Referring again to FIGS. 7 and 9, the computer 950 then prompts the operator 550 to scan the "written document" 740 printed by the mechanical handwriting system 100. The scanned written document is at least temporarily stored in a form representing the generated printed graphic or the actual printed graphic, such as an actual scalable vector graphic. Subsequently, the computer 950 compares 750 the reference scalable vector graphic with the actual scalable vector graphic to determine if the actual printed document matches the ordered text. In the comparison of the reference scalable vector graphic with the actual scalable vector graphic, one or both of the reference and actual scalable vectors graphics are optionally and preferably reformatted, such as resized with a sizing function, rotated with a rotation function, and/or light normalized with a light normalization function to aid comparison of the reference scalable vector graphic with the actual scalable vector graphic representing the printed order. An approval step 760 follows, which is further described infra. If approved, the computer 950 indicates approval to the operator 550 and instructs the operator to distribute the documents 770, such as via mail/post/carrier/courier delivery. Optionally, the computer 950 at this time prompts the operator to insert into the envelope 534 an insert, such as a business card and/or an advertisement, and/or to apply postage to the envelope, such as an international stamp.

Example II

In this second example, the quality control process 700 is further described for an exemplary print job. As in the previous example, the operator 550 scans the manifest 600 and the computer 950 links a scanned graphical code to a print job 620. The computer loads the ordered graphic 720 and now prompts the operator 550 to scan the "written" document(s) 740 printed by the mechanical handwriting system 100. Referring to FIG. 9, the operator 550 places the print job 620, such as a printed document 930 into a light box equipped with lighting 940, such as LED strips and/or light bulbs, and a digital camera 920. The lighting lights the printed document 930 and the operator 550 operates the camera 920, such as through a foot pedal. The scanned image of the "written" document is now compared with the ordered graphic 720, as further described herein.

Figure 8D:
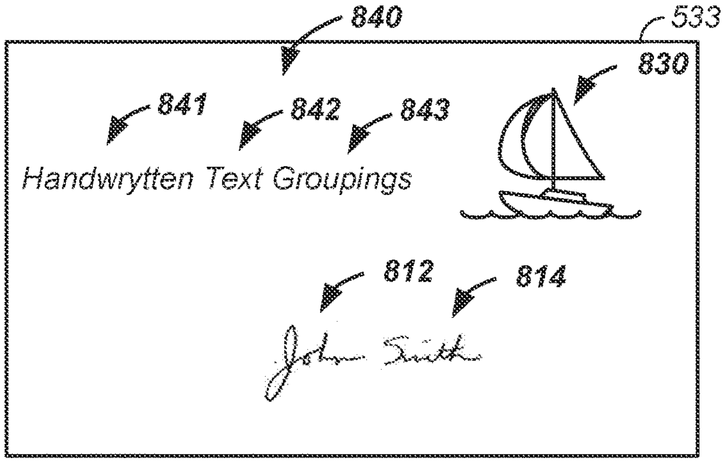
FIG. 8D illustrates a printed card.

Referring now to FIG. 8(A-D), in this example, the "written" document is illustrated in FIG. 8D as a handwritten job 533. As illustrated, the handwritten job 533 includes text 840, such as a first grouping of letters 841, a second grouping of letters 842, and a third grouping of letters 843; a signature 810, with a first name 812 and a last name 814; a symbol 820, a smiley face; and a doodle 830, a sailboat. In the comparison of the ordered graphic 720 and the "written" document, groupings are compared. For instance, referring now to FIG. 8A, the signature 810 is illustrated as a first grouping 812 and a second grouping 814, where the groupings are identified by the computer based on a blank space between written groupings, where the blank space has a length of greater than 1, 2, 5, or 10% the length of a grouping. In the comparison of the ordered and written documents, graphical representations are compared. Particularly, the reference scalable vector graphic of the first grouping is compared with the actual scalable vector graphic of the first grouping. This eliminates the problematic optical character recognition problem of deciphering alphabet characters of a scribbled and often totally undecipherable handwritten signature. In this case, the signature 810 is determined, through use of blank space separating written sections, to have a second grouping 814. In the quality control process 700, the reference and actual scalable vector graphics of the second grouping are optionally and preferably compared. Similarly, referring now to FIG. 8B, the symbol 820 of the smiley face is stored as a reference scalable vector graphic and is compared with the actual written scalable vector graphic, such as in a third grouping comparison, in the quality control process 700. Similarly, referring now to FIG. 8C, the doodle 830 of the sailing ship is stored as a reference scalable vector graphic and is compared with the actual written scalable vector graphic, such as in a fourth grouping comparison, in the quality control process 700. Similarly, referring now to FIG. 8D, the text 840 is stored as a reference scalable vector graphic and is compared with the actual written scalable vector graphic, such as in a fifth grouping comparison, in the quality control process 700. For instance a first text grouping 841, a second text grouping 842, and/or a third text grouping 843 are compared with corresponding reference text groupings in the quality control process. Since vector graphics are compared, it does not matter if the text is in English and/or if the text contains a made up word or a copyrighted word/phrase/slogan, such as "handwrytten". This allows and operator to verify the text even if the operator reads a language different from the written text. Generally, the received order is saved and represented with a set of n groupings, referred to as the order, the reference order, the reference graphic, and/or the reference scalable vector graphics, where each group of the n groupings are compared, such as in a 1:1 comparison, with a corresponding group of n groupings of the generated document, the printed document, and/or the "handwritten" document generated by the mechanical handwriting system 100, such as the printed scalable document imaged in the light box 910. In the quality control process 700, not all groupings need to be compared to confirm the print job matches the order, but preferably greater than 0, 1, 2, 3, 5, 10, or 20 groupings are compared.

The quality control process 700 optionally and preferably prompts for insertion of each "written" document of a job into the light box 910 for imaging and comparison. For instance, the system optionally and preferably prompts for an envelope with "written" text on it, generated by the mechanical handwriting system 100, to be inserted into the light box 910 for imaging and comparison before or after the corresponding text/letter print job for insertion into the envelope is imaged and compared. At this time, the computer 950, optionally and preferably prompts the operator 550 to insert an insert into the envelope, such as a gift card, and/or to apply specialized postage to the envelope, such as an international stamp.

Figure 10:
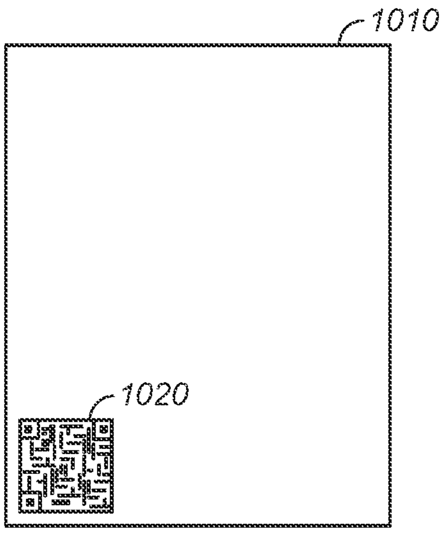
FIG. 10 illustrates a markable surface.

Referring now to FIG. 10, print stock, card stock, paper stock, and/or a markable surface 1010 is optionally and preferably marked with a markable surface code 1020, which is an example a machine readable graphic code. The markable surface code 1020 is on the markable surface 1010, such as on a piece of paper loaded into the plotter system 140 and/or a printer. The markable surface code 1020 is optionally a printable media code 1022, which identifies the type of markable surface 1010, the size of the print stock, the orientation of the print stock, and/or a type of paper, as further described in reference to FIG. 11, infra. The markable surface code 1020 is optionally an order identification code 1024, such as a unique order identification code, which links to a database to determine what is to be printed, as further described in reference to FIG. 12, infra.

Figure 11:
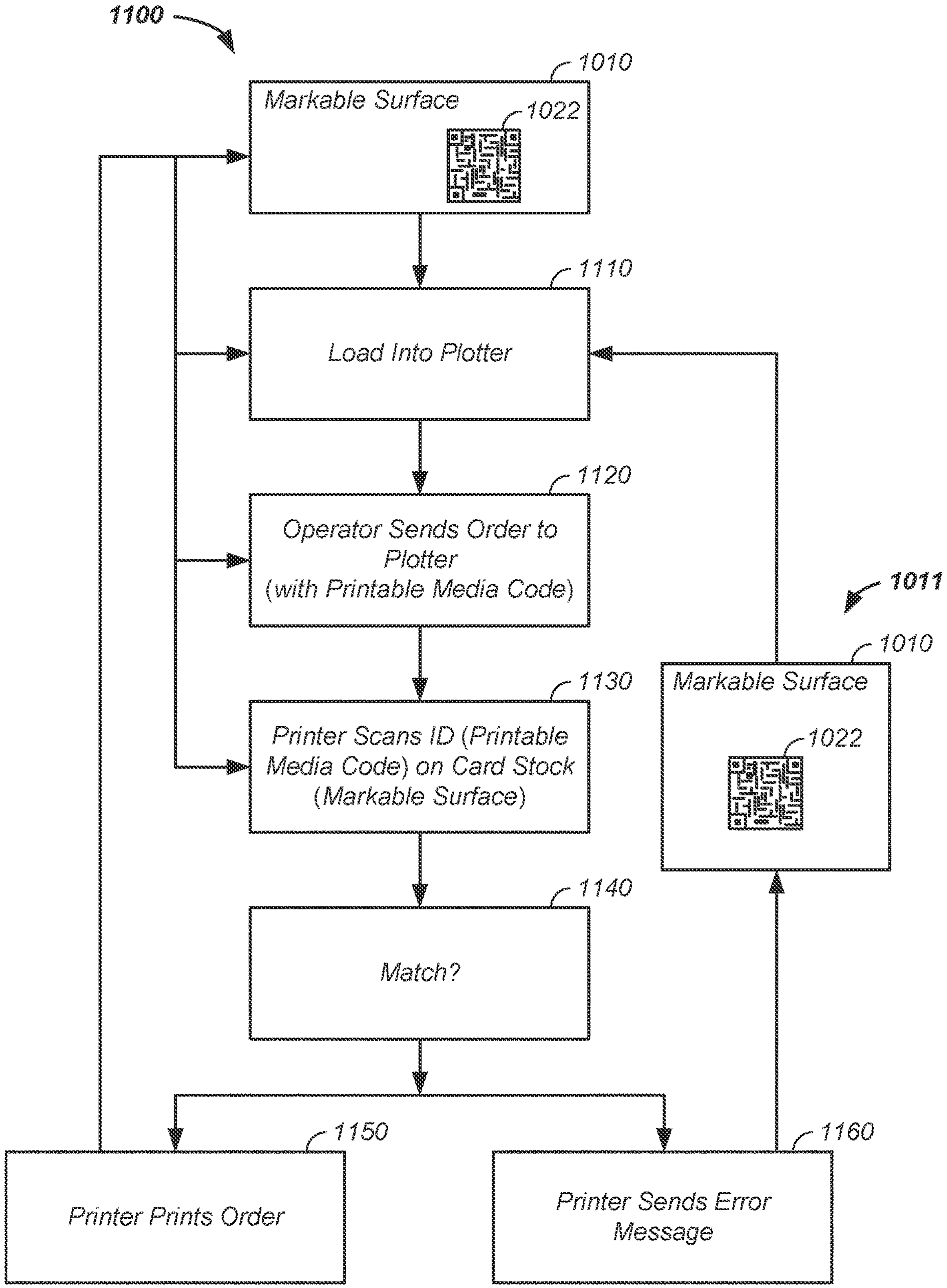
FIG. 11 illustrates card ids identified via a barcode.

Referring now to FIG. 11, a first printing process 1100 is described, where the printable media code 1022 is used in a control of a print process, such as in a first quality assurance process. As illustrated, the markable surface 1010, such as a card stock, is marked with the printable media code 1022, which is an example of a graphical code 1020, a markable surface code, a graphical markable surface code, a QR-code, and/or a barcode. The printable media code 1022 identifies at least one of: a type of card stock, a paper thickness, an x/y-dimension of the printing paper, a position of the paper, and/or an orientation of the printing paper, where the card stock and the printing paper are examples of the markable surface 1010. The paper is subsequently loaded 1110 into the plotter system 140 and/or a printer. The operator 550 and/or a robot sends an order 1120 to the plotter 150/printer, where the order contains a digital version of the printable media code. The plotter 150/printer scans 1130 the printed printable media code 1022 on the markable surface 1010 to optionally confirm orientation of the print/card stock and/or to confirm the print/card stock matches the order. For instance, the card stock has printed on it a particular printable media code 1022. The order to print has attached with it a particular digital version of the printable media code 1022 that must match the printed printable media code 1022 on the markable surface 1010. If a match 1140 occurs, the plotter 150/printer proceeds with printing the order 1150, or at least a page and/or section of the order. If the match 1140 of the digitally sent printable media code does not match the printed printable media code 1022, then an error message is sent to the operator 550 and/or the robot. In the case of a failure, replacement paper 1011, such as a different markable surface 1010/card stock is optionally loaded into the plotter and the process is optionally and preferably repeated. In the case of a successful print, the first printing process 1100 is optionally repeated until the end of a current job with 1, 2, 3, or more pages to print and/or until 1, 2, 3, or more print jobs are completed.

A thickness of the paper 230 is optionally greater than 0.002, 0.003, 0.004, 0.005, 0.007, 0.009, 0.010, 0.015, or 0.020 inches thick. A thicker piece of paper is optionally used for a deeper indentation trail. Optionally, the paper 230 is backed in the mechanical handwriting system 100 with 1, 2, 3, 4, 5, or more pieces of paper, which yields a deformable backing of the paper 230, which allows for an indentation trail and/or a deeper indentation trail on the paper 230. The indentation trail is optionally deeper than 0.00005, 0.0005, 0.001, 0.002, 0.003, 0.004, 0.005, 0.007, 0.009, 0.010, 0.015, or 0.020 inches thick.

Figure 12:
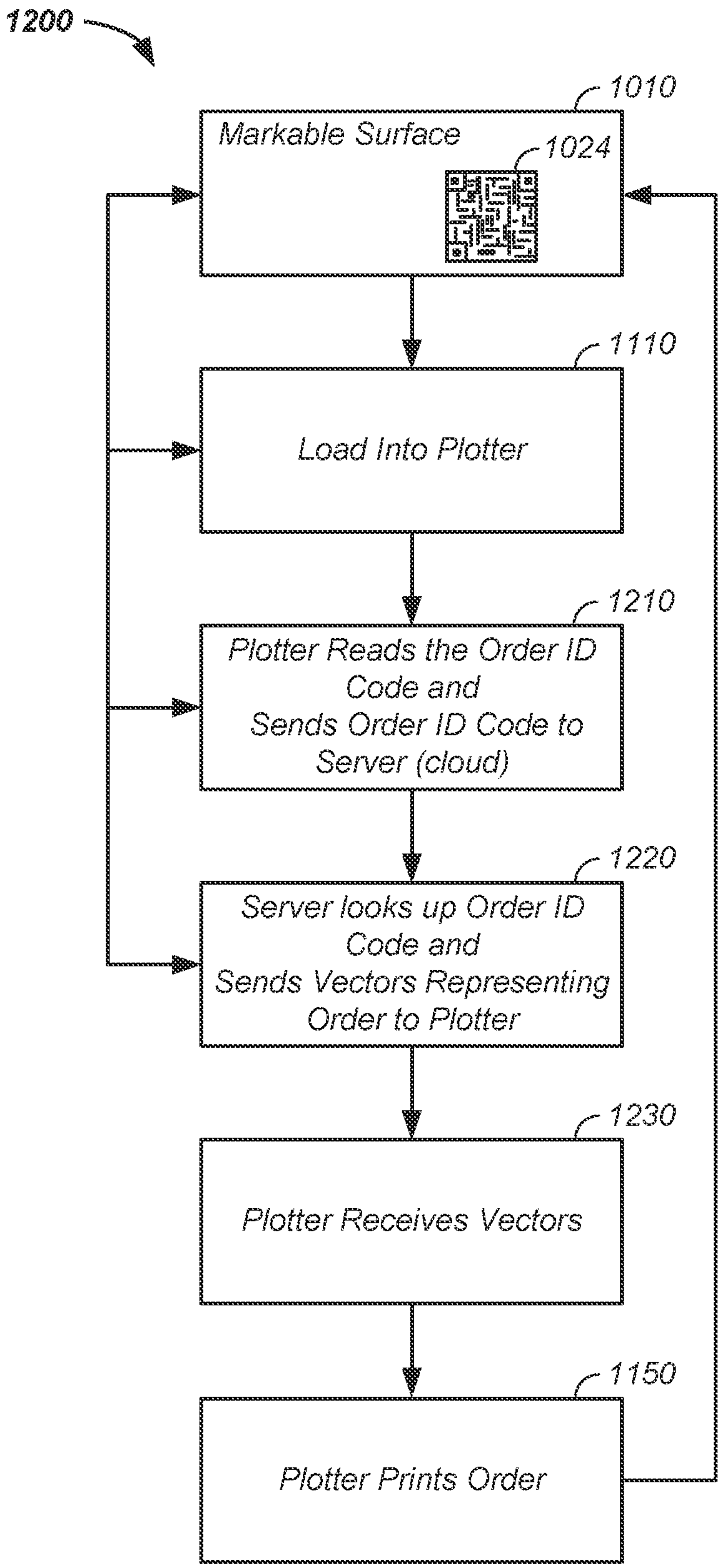
FIG. 12 illustrates cards marked with order ids.

Referring now to FIG. 12, a second printing process 1200 is described, where the second printing process 1200 resembles the first printing process 1100, except instead of the operator 550 sending the print code to the plotter 150/printer, the plotter 150/printer reads the print code and sends the print code to a server/cloud with the print job information. For example, in the second printing process, the markable surface 1010 is marked with the order identification code 1024, as opposed the markable surface 1010 being marked with the printable media code 1022 in the first printing process 1100. The order identification code 1024 is linked to information to be printed according to an order, such as programmed into the second printing process 1200 or more likely as ordered from a receiving web page. For instance, a client orders 12 total pages of a common letter to 12 addresses, where 12 is representative of any positive integer. As in the first process 1100, the order identification code 1024 identifies at least one of: a type of card stock, a paper thickness, an x/y-dimension of the printing paper, a position of the paper, and/or an orientation of the printing paper, where the card stock and the printing paper are examples of the markable surface 1010. Thus, in one step 1210, the plotter 150/printer reads the order identification code 1024 and sends the order identification code 1024 to a server/cloud containing the orders to be printed. In a subsequent step 1220, the server/cloud/database/computer looks up the order identification code 1024, finds vectors representing the print job order identified by the order identification code 1024, and sends the vectors representing the print job (matching the order identification code 1024) to the plotter 150/printer. The plotter 150/printer receives the job vectors 1230 to be placed onto the markable surface 1010 and prints the order 1150. The second printing process 1200 is optionally repeated until the end of a current job with 1, 2, 3, or more pages to print and/or until 1, 2, 3, or more print jobs are completed.

Figure 13:
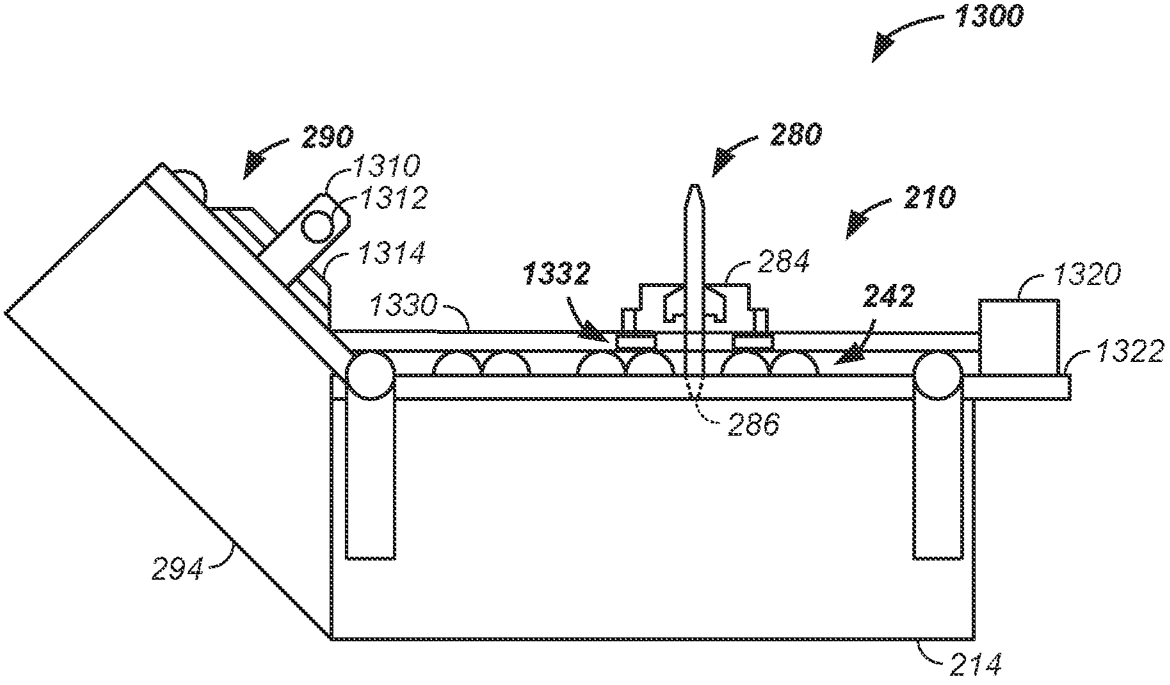
FIG. 13 illustrates a barcode writer.

Referring now to FIG. 13, a barcode equipped 1300 plotter system 140 is illustrated. The barcode equipped 1300 plotter system 140 is illustrated with two optional systems: (1) a barcode scanner 1310 and (2) a barcode writer 1320. The barcode scanner 1310 and the barcode writer 1320 are each described, infra.

Referring still to FIG. 13, the barcode scanner 1310 is further described. The barcode scanner 1310 optionally reads, from the markable surface 1010, any graphical code, machine readable code, and/or machine readable graphic code with or without the use of images and/or numbers, such as a barcode, a QR code, and/or a code comprising numbers, lines, squares, and/or patterns. The barcode scanner 1310 is optionally and preferably attached and/or is replaceably attached to the plotter system 140, such as to any part of the paper positioning system 210 and/or the paper feed assembly 290. As the barcode, or similar, is optionally and preferably read after the paper is loaded into plotter system 140, as described supra, the barcode scanner 1310 is optionally and preferably attached to and/or positioned to read paper loaded into the paper feed assembly 290. As positioned, the barcode scanner optionally reads the next paper to be processed, such as immediately and/or subsequently operated on by the downstream paper positioning system 210 and/or the plotter 280. In one implementation, the barcode scanner 1310 reads any barcode marked onto the markable surface 1010, print stock, card stock, and/or a type of paper, such as the markable surface code 1020, the printable media code 1022, and/or the order identification code 1024. The barcode scanner 1310 is optionally capable of reading markings not readily visible with the naked eye, such as micro-markings and/or invisible markings, such as written with ultraviolet ink and/or fluorescing ink. Thus, the barcode scanner optionally contains an ultraviolet illumination source 1312. The barcode scanner 1310 is optionally and preferably attached with a mounting element 1314 to the paper feed assembly 290. The barcode scanner 1310 and associated barcode/markable surface code 1020 is optionally used in/with any device/process described herein.

Referring still to FIG. 13, the barcode writer 1320 is further described. The barcode writer 1320 optionally writes to the markable surface 1010 any graphical code, machine readable code, and/or machine readable graphic code with or without the use of images and/or numbers, such as a barcode, a QR code, and/or a code comprising numbers, lines, squares, and/or patterns. The barcode writer 1320 optionally and preferably marks the now printed paper with a code uniquely identifying the printed paper and/or relating the printed paper to a job code sub-element. The barcode writer 1320 is optionally and preferably attached and/or is replaceably attached to the plotter system 140, such as to any part of the paper positioning system 210 and/or the paper feed assembly 290. As the barcode, or similar, is optionally and preferably written after the paper is loaded into plotter system 140, as described supra, and the barcode scanner 1310 is preferably positioned on the paper feed system 290, the barcode writer 1320 is optionally and preferably attached to and/or is optionally and preferably positioned on the plotter system 140 after the document is "printed", with the plotter 280, such as in a position after the plotter 280, after the paper positioning system 210, and/or on an attachment 1322 to the paper positioning system 210. As illustrated, the barcode writer 1320 is attached to the plotter system 140 in a position to mark on the paper 230 after printing and before the paper 230 is ejected/removed from the plotter system 140, which allows a quality control to ensure the output paper contains printing and a barcode that matches the printing. In one implementation, the barcode writer 1320 marks with any barcode type onto the markable surface 1010, print stock, card stock, and/or a type of paper, such as the markable surface code 1020, the printable media code 1022, and/or the order identification code 1024. The barcode writer 1320 is optionally capable of placing markings not readily visible with the naked eye, such as micro-markings and/or invisible markings, such as written with ultraviolet ink and/or fluorescing ink. The barcode writer 1320 is optionally and preferably attached with a printer mounting element to the plotter system 140. The barcode writer 1320 and associated barcode/markable surface code 1020 is optionally used in/with any device/process described herein. The barcode writer 1320 is optionally a thermal printer, inkjet printer, laser engraver, awl engraver, and/or a stamping device. Optionally and preferably, the barcode is marked onto the markable surface, under control of and/or based on communication from a server, a print job controller, a print job, and/or the main controller 110.

Referring still to FIG. 13, the barcode scanner 1310 optionally contains one or more and optionally all of the elements of the barcode reader 1320 and vice versa to form a combination barcode writer/scanner system.

Referring still to FIG. 13, the plotter 280 is illustrated with an optional guide rail 1330 and guide rollers 1332, which control movement of the plotter 280, the connector 284, and/or the plotter pen 286.

Figure 14A:
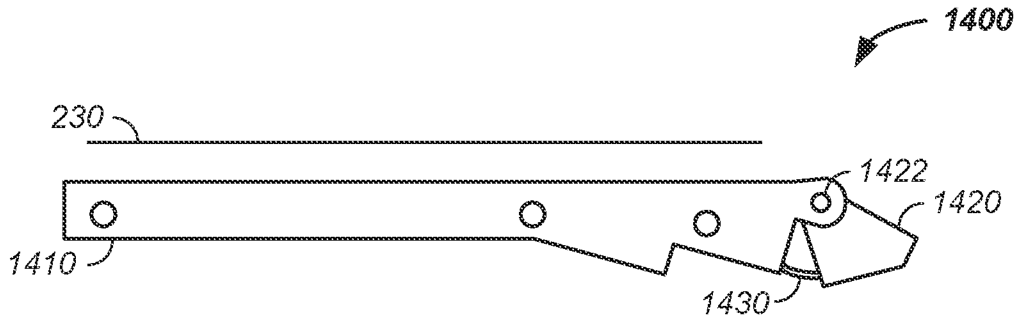
FIG. 14A illustrates a multi-part spring loaded paper backer and FIG. 14B illustrates a single printed spring force paper backer.

Referring now to FIG. 14A, a multi-component paper backing system 1400 is illustrated. The multi-component paper backing system 1400 includes three components: a first backplate 1410, a first foot 1420, and a first spring 1430. The first backplate 1410 supports the paper 230, such as at any point in the plotter 280, in the paper positioning system 210, and/or in the paper feed assembly 290. The first foot 1420 pushes on one side against any support mechanism of the plotter 280, such as: a frame, the paper feed assembly 290, the base unit 291, the end unit 292, the paper positioning system 210, the paper positioning base unit 212, the first side rail 214, the second side rail 216, the first edge rail 294, and the second edge rail 296. The first foot 1420 is hingedly connected to the first backplate 1410, such as with a dowel pin, and pushes against the first backplate 1410 with a spring 1430. The spring force of the spring 1430 pushes the first backplate 1410 into a position supporting the paper and/or countering a pressure, such as from a roller wheel. The hinged foot 1420 bends slightly under the force of a roller wheel to allow a piece of media or other print stock through the paper feed mechanism and the spring 1430 forces the hinged foot 1420 back into a resting place and applies a backpressure to the roller wheel. The three part system of the multi-component paper backing system 1400 requires assembly during construction.

Figure 14B:
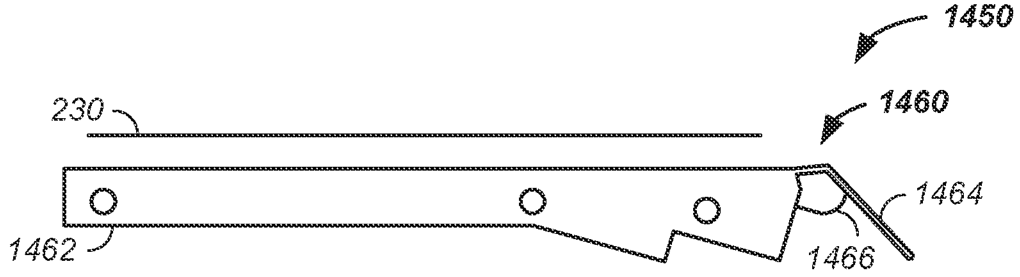

Referring now to FIG. 14B, a uniform paper backing system 1450 is illustrated. The uniform paper backing system 1450 fulfills the same purpose as the multi-component paper backing system 1400 in terms of supporting the paper 230 and pushes against the same component(s) of the plotter 280 as the multi-component paper backing system 1400. However, the uniform paper backing system 1450 is optionally a molded part and/or is 3-D printed, such as in a single part. Thus, the uniform paper backing system 1450 does not take time to assemble during construction of the plotter 280. For example, the uniform paper backing system 1450 includes a single piece that comprises at least: (1) a second backplate 1462 and (2) a lever 1460. The lever 1460 includes a lever arm 1464 and optionally includes a connector 1466, where the lever arm connects to the second backplate, such as to form an angle of between 10 and 90 degrees. The connecter 1466 optionally and preferably supports a weak point at the interface of the level arm 1464 and the second backplate 1462. A compliance of a material of the uniform paper backing system 1450 allows the lever arm 1464 to bend relative to the second backplate 1462 and thus provide a force, akin to the spring force of the multi-component paper backing system 1400, that applies a backpressure to the roller wheel, such as when loading a new piece of paper. Optionally and preferably, the second backplate 1462 comprises a second thickness that is at least 10, 20, 50, 100, or 200 percent of a first thickness of the lever arm 1464.

Figure 15:
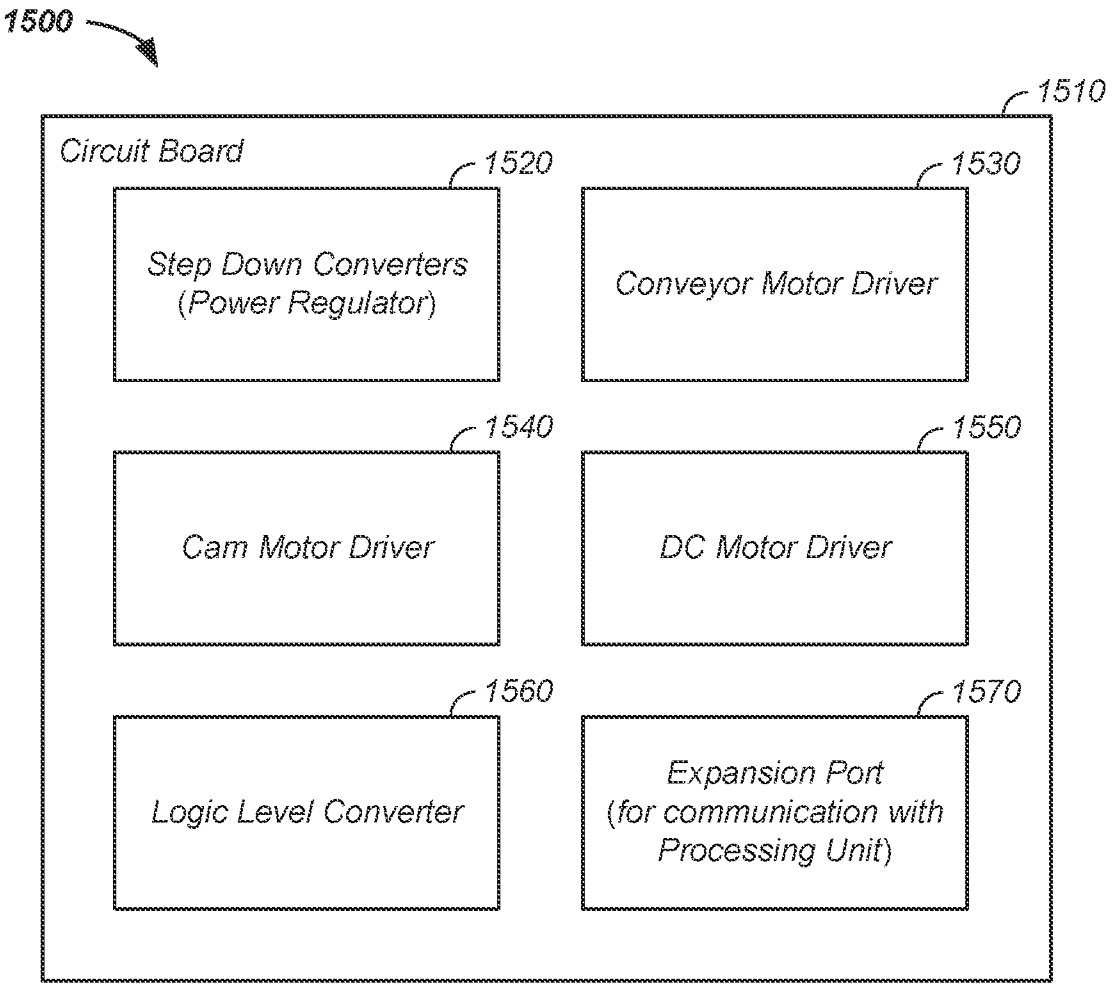
FIG. 15 illustrates a circuit board.

Referring now to FIG. 15, a circuit controller 1500 of the main controller 110 is illustrated. The circuit controller includes a circuit board 1510 comprising at least one of: a power splitter 1520, a first stepper motor module to control the conveyor 1530, a second stepper motor module to control the paper loader cam 1540, a direct current motor driver for the paper feed 1550, a logic controller 1560, and an expansion port 1570, such as for connecting to the main controller 110 and/or a main computer module. As illustrated, the circuit board 1510 is a unified circuit board containing all motor drivers of the mechanical handwriting system 110, such as for all of the paper movement system 130, the plotter system 140, and the paper feeder system 150, which simplifies assembly and maintenance of the mechanical handwriting system 110.

Still yet another embodiment includes any combination and/or permutation of any of the elements described herein.

The main controller client includes a computer-readable storage medium, such as memory. The memory includes, but is not limited to, an electronic, optical, magnetic, or another storage or transmission data storage medium capable of coupling to a processor, such as a processor in communication with a touch-sensitive input device linked to computer-readable instructions. Other examples of suitable media include, for example, a flash drive, a CD-ROM, read only memory (ROM), random access memory (RAM), an application-specific integrated circuit (ASIC), a DVD, magnetic disk, an optical disk, and/or a memory chip. The processor executes a set of computer-executable program code instructions stored in the memory. The instructions may comprise code from any computer-programming language, including, for example, C originally of Bell Laboratories, C++, C#, Visual Basic® (Microsoft, Redmond, WA), Matlab® (MathWorks, Natick, MA), Java® (Oracle Corporation, Redwood City, CA), and JavaScript® (Oracle Corporation, Redwood City, CA).

Herein, any number, such as 1, 2, 3, 4, 5, is optionally more than the number, less than the number, or within 1, 2, 5, 10, 20, or 50 percent of the number.

Herein, an element and/or object is optionally manually and/or mechanically moved, such as along a guiding element, with a motor, and/or under control of the main controller.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationships or physical connections may be present in a practical system.

In the foregoing description, the invention has been described with reference to specific exemplary embodiments; however, it will be appreciated that various modifications and changes may be made without departing from the scope of the present invention as set forth herein. The description and figures are to be regarded in an illustrative manner, rather than a restrictive one and all such modifications are intended to be included within the scope of the present invention. Accordingly, the scope of the invention should be determined by the generic embodiments described herein and their legal equivalents rather than by merely the specific examples described above. For example, the steps recited in any method or process embodiment may be executed in any order and are not limited to the explicit order presented in the specific examples. Additionally, the components and/or elements recited in any apparatus embodiment may be assembled or otherwise operationally configured in a variety of permutations to produce substantially the same result as the present invention and are accordingly not limited to the specific configuration recited in the specific examples.

Benefits, other advantages and solutions to problems have been described above with regard to particular embodiments; however, any benefit, advantage, solution to problems or any element that may cause any particular benefit, advantage or solution to occur or to become more pronounced are not to be construed as critical, required or essential features or components.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A method for producing a handwritten appearance of input text on a marking surface, comprising the steps of:

receiving, into a plotter system, a print job related to a first graphic code, said print job comprising a printable media requirement;

scanning, with a scanner attached to said plotter system, said first graphic code, said first graphic code previously printed on the marking surface loaded into said plotter system;

identifying a particular media type of the marking surface with said first graphic code;

confirming said printable media requirement matches said particular media type; and emulating handwriting on the marking surface with said plotter system to yield a marked paper.

2. The method of claim 1, said step of confirming further comprising the step of:

receiving a positive confirmation before said step of emulating.

3. The method of claim 1, further comprising the steps of:

marking, with a graphic marking system attached to said plotter system, onto the marking surface a second graphic code prior to removal of the marked paper from said plotter system, said second graphic code uniquely identifying the marked paper.

4. The method of claim 1, said step of marking further comprising the step of:

forming at least one of a barcode and a QR code on the marking surface.

5. The method of claim 3, further comprising the step of:

marking onto an envelope a third graphic code prior to removal of the envelope, said third graphic code uniquely identifying the envelope.

6. The method of claim 5, further comprising the step of:

confirming said second graphic code and said third graphic code correspond to said print job prior to inserting the marked paper into the envelope.

7. The method of claim 5, further comprising the steps of:

loading a current marking surface, repeating said steps of loading and emulating n times, wherein said print job contains n print orders and n is a positive integer greater than five, wherein said step of emulating changes applied vectors to the current marking surface.

8. The method of claim 6, further comprising the step of:
backing the marking surface with a backplate connected to a lever arm to form a single piece element; and
deforming said lever arm to provide a counter force to the marking surface via said backplate.

9. The method of claim 8, further comprising the step of:
applying a downward force of greater than one-half ounce, with a plotter pen of said plotter system, to the marking surface to leave an indentation trail on the marking surface.

10. The method of claim 8, further comprising the step of:
applying a downward force of a least two ounces with a plotter pen to the marking surface to yield indentation marks, said plotter pen weighing at least two ounces.

11. The method of claim 1, further comprising the step of:
providing a single piece lever arm comprising a backplate and a lever arm forming an angle of greater than five degree and less than ninety degrees; and
applying pressure to said lever arm, the pressure transferred to the backplate, said backplate supporting the marking surface.

12. The method of claim 11, further comprising the step of:
controlling with a single circuit board all of:
a direct current motor driving a paper feed of said plotter system;
a first stepper motor linked to a paper loader cam of said plotter system; and
a second stepper motor linked to a conveyor belt of said plotter system.

13. The method of claim 12, further comprising the step of:
backing the marking surface with a conveyor belt, said conveyor belt comprising a deformable surface.

14. An apparatus for producing a handwritten appearance of input text on a marking surface, comprising:
a plotter system configured to receive a print job related to a first graphic code, said print job comprising a printable media requirement;
a scanner, attached to said plotter system, configured to scan said first graphic code, said first graphic code previously printed on the marking surface loaded into said plotter system; and
a main controller of said plotter system configured to:
identify a particular media type of the marking surface with said first graphic code; and
confirm said printable media requirement matches said particular media type,
wherein said plotter system emulates handwriting on the marking surface to yield a marked paper.

15. The apparatus of claim 14, further comprising:
a graphic marking system attached to said plotter system, said graphic marking system configured to mark onto the marking surface a second graphic code prior to removal of the marked paper from said plotter system, said second graphic code uniquely identifying the marked paper.

16. The apparatus of claim 15, aid graphic marking system comprising at least one of:
a thermal printer;
an inkjet printer;
a laser engraver;
an awl engraver; and
a stamping device.

17. The apparatus of claim 16, said inkjet printer further comprising:
a container holding ultraviolet ink.

18. The apparatus of claim 14, further comprising:
a backplate positioned to support the marking surface; and
a lever arm, said lever arm and said backplate forming a single 3-D printed object, wherein bending said lever arm yields a force transferred through said backplate toward the marking surface.

19. The apparatus of claim 18, further comprising:
a single circuit board of said plotter system, said single circuit board comprising:
a paper load cam stepper motor control;
a conveyor belt stepper motor control; and
a direct current motor control, said direct current motor mechanically linked to a paper feed.

20. The apparatus of claim 14, further comprising:
a conveyor belt backing the marking surface, said conveyor belt comprising a deformable surface.

* * * * *